Aug. 1, 1967  P. MONGITORE  3,333,577
ROTARY ENGINE

Filed March 22, 1965  6 Sheets-Sheet 1

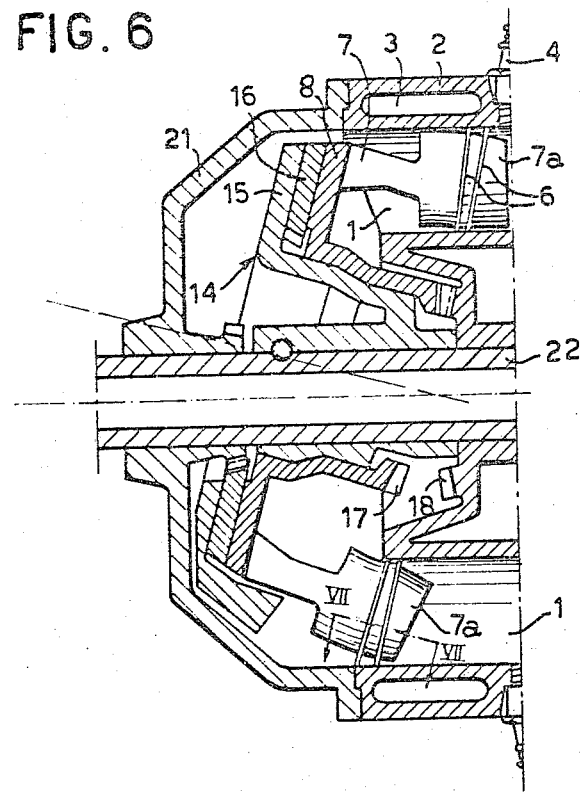
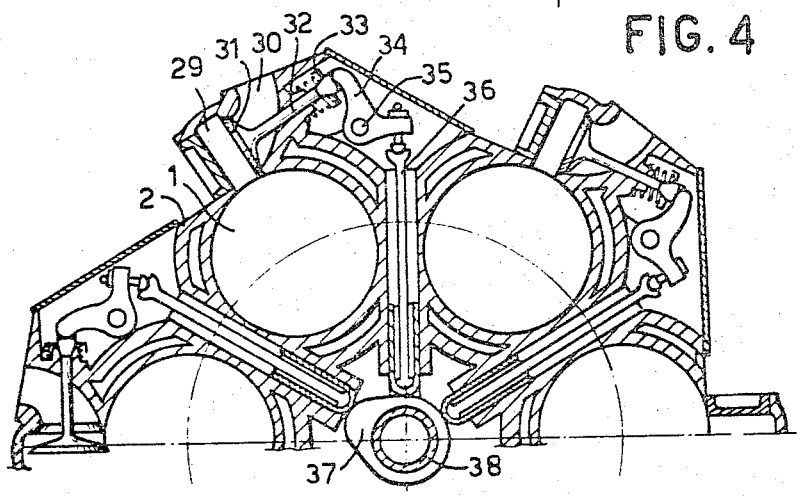

Aug. 1, 1967   P. MONGITORE   3,333,577
ROTARY ENGINE
Filed March 22, 1965   6 Sheets-Sheet 4
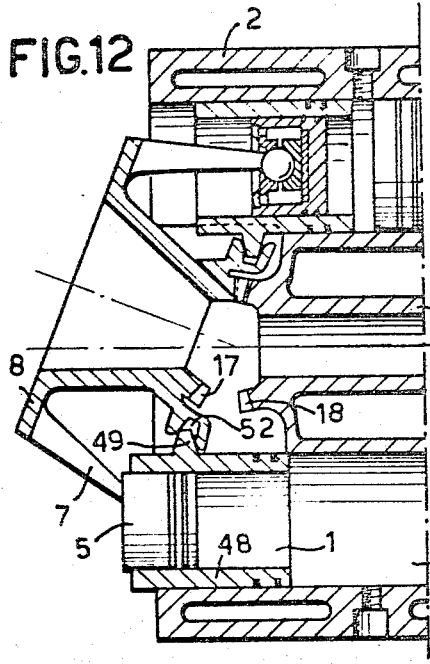
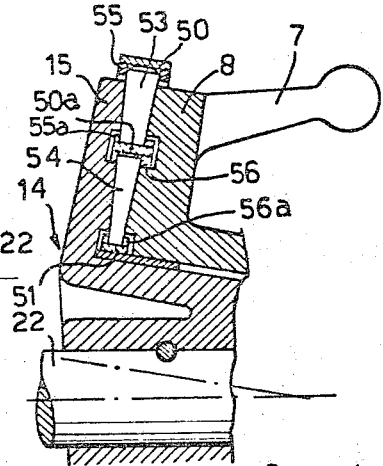
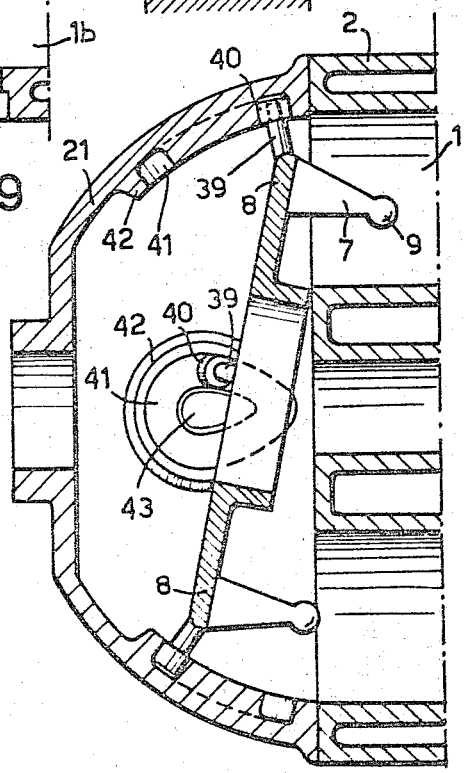
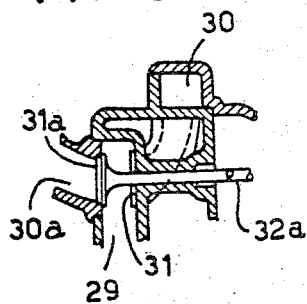

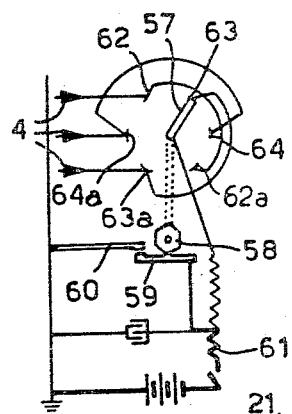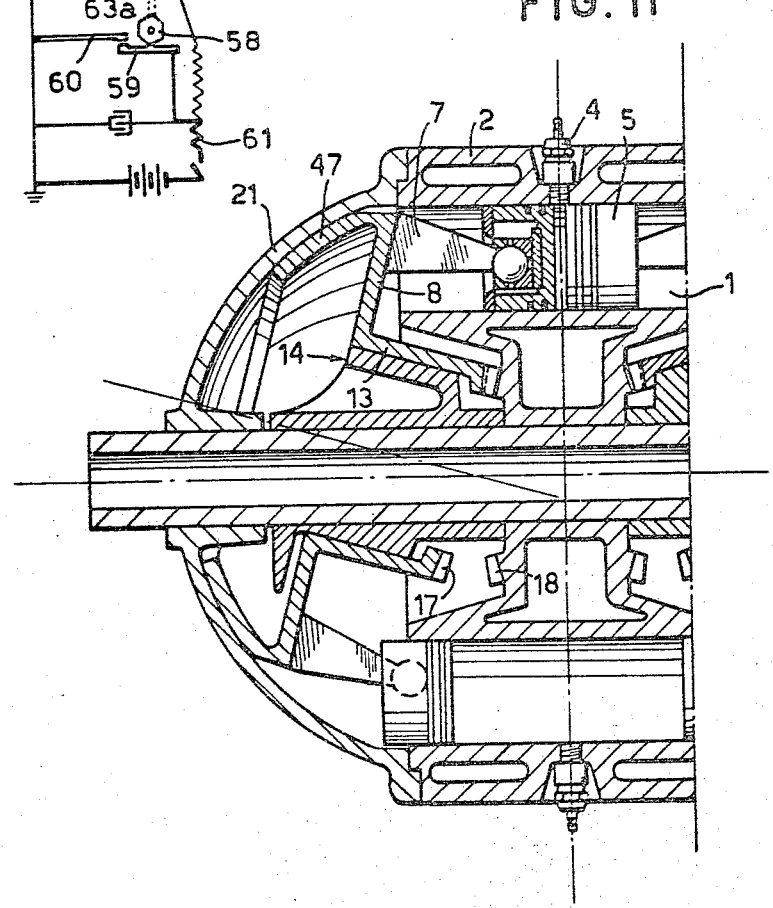

United States Patent Office 3,333,577
Patented Aug. 1, 1967

3,333,577
ROTARY ENGINE
Pietro Mongitore, 200 Corso Giovanni Agnelli, Turin, Italy
Filed Mar. 22, 1965, Ser. No. 441,556
Claims priority, application Italy, Mar. 25, 1964, 6,903/64, 6,904/64, 6,909/64; Sept. 7, 1964, 19,508/64
9 Claims. (Cl. 123—18)

ABSTRACT OF THE DISCLOSURE

A rotary internal combustion engine has cylinders positioned around a central driven shaft and reciprocating pistons deliver power to an inclined member on the shaft through a flanged transmission member. The flanged transmission member includes a flange cooperating with the inclined member, rigid stays connected to the pistons, and is guided from a stationary housing so that it moves along a cycloidal path. The cylinders are straight or are curved, circular or noncircular in section. Intermediate members between the pistons and cylinders or between the transmission member and inclined member move at a lower speed to reduce friction.

---

This invention relates to rotary engines, more particularly rotary internal combustion engines of the type comprising a plurality of chambers arranged about and parallel to a main axis and having at least one of their end walls movable in order to define variable volume chambers for carrying out the working cycles, the movable wall or walls of each chamber being connected to an inclined member carried by a central shaft for transmitting motion from the movable walls to the shaft or vice-versa.

Engines of this type are subject to various functional troubles due to presence of heavy reciprocating masses, friction between relatively movable parts, sealing and lubricating difficulties and the like.

This invention provides an engine of the type referred to above, which is of small size and high efficiency, and in which friction between sliding parts is considerably reduced and the reciprocating masses are negligible.

With this object in view this invention provides an engine of the type referred to above, wherein the means for transmitting motion between the movable walls and the inclined member carried by the shaft comprise a flanged transmission member in the form of a flanged sleeve rotatably mounted on the inclined member carried by the shaft and having fast therewith a plurality of rigid stays protruding from one face of its flange and connected by their free ends to the movable chamber walls, the said transmission member being connected with the parts so that it moves throughout along paths belonging to the family of cycloids.

Figure 1:
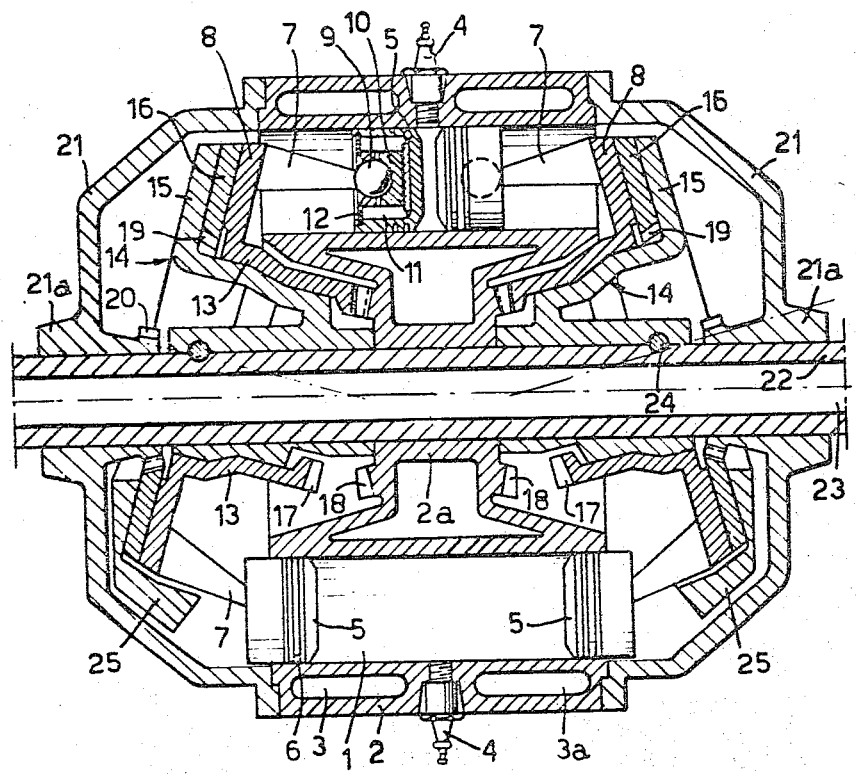
Figure 7:
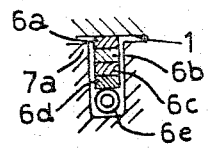
Figure 8:
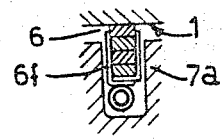
Figure 2:
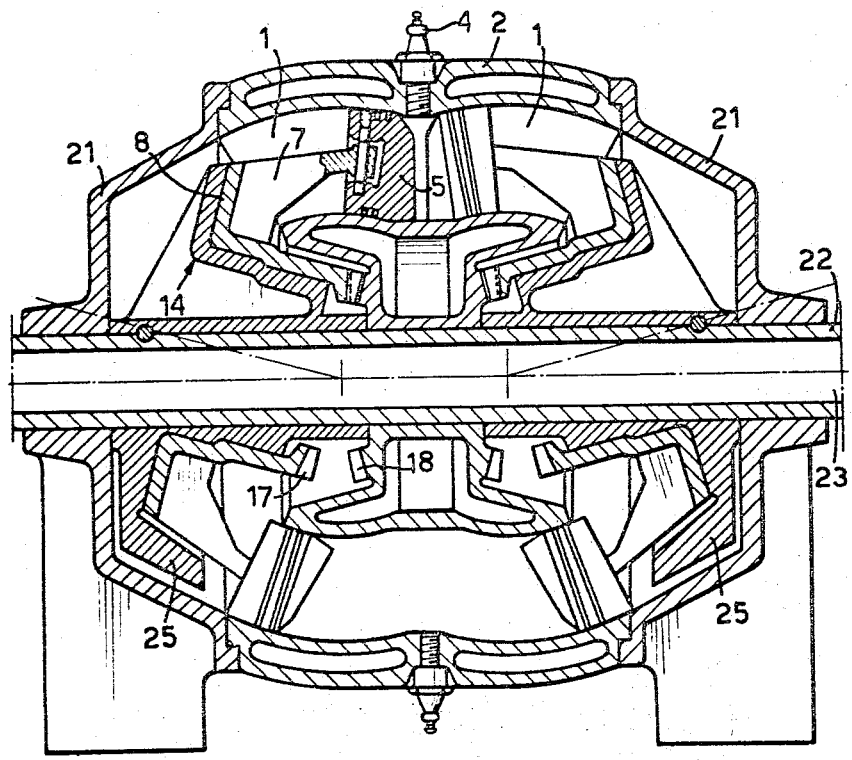
Figure 3:
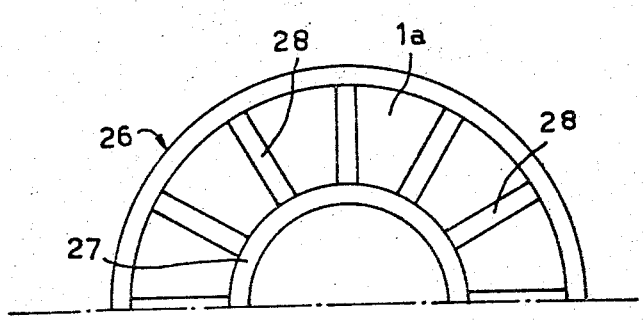
Figure 10:
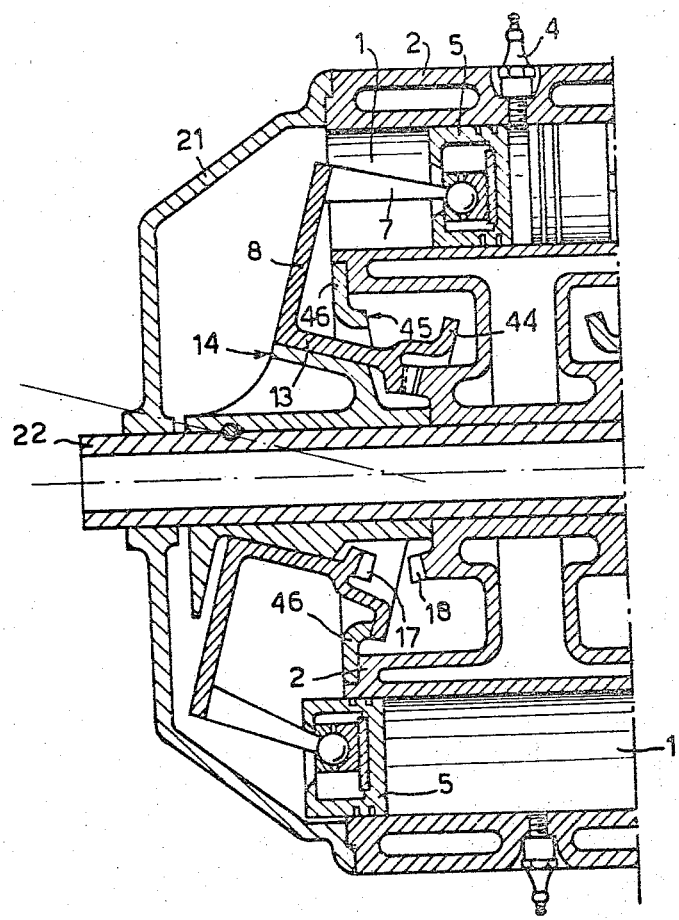

The invention will be described with reference to the accompanying drawings which are given by way of example, and wherein:

FIGURE 1 is a diagrammatical axial sectional view of a machine according to this invention operating as an internal combustion engine, FIGURE 2 is an axial sectional view of an engine according to a modification of FIGURE 1, FIGURE 3 is a diagrammatical cross sectional view of a part of FIGURE 2, FIGURE 4 is a cross sectional view showing a modification of the fluid distributing means, FIGURE 5 is a part cross sectional view showing a modification of FIGURE 4, FIGURE 6 is a part sectional view of an engine according to a modification of FIGURE 1, FIGURES 7 and 8 are two part sectional views on an enlarged scale on line VII—VII of FIGURE 6, FIGURE 9 is a part axial sectional view of an engine according to a further modification of FIGURE 1, FIGURES 10 and 11 are two part axial sectional views showing two further modifications of FIGURE 1, FIGURE 12 is a part axial sectional view of an engine according to a modification of FIGURE 1, FIGURE 13 is an axial sectional view on an enlarged scale showing a detail of FIGURE 1 and FIGURE 14 is a wiring diagram of the ignition control.

In the embodiments shown the machine operates as an internal combustion engine, more particularly of a type in which the chambers in which the thermodynamic cycles are performed are stationary and the engine shaft is rotatable. Of course, a similar engine can be carried out with rotating chambers, the other components being stationary.

Referring to FIGURE 1, 1 denotes a plurality of cylindrical chambers 1 provided in an engine block 2, which is one of the stationary engine components, in the walls of which conduits 3, 3a can be provided for circulation of the coolant.

All the embodiments shown refer to a construction in which the chambers 1 have both end walls movable, the engine comprising two similar symmetrical units.

The middle portion of the chamber accommodates spark plugs 4 or injectors depending upon whether the engine is of the spark ignition or Diesel type.

The movable end walls 5 cooperate with the chambers 1 by reciprocating in an axial direction so as to vary the free chamber volume. The movable walls 5 are provided with sealing members in the form of resilient segments of known type which effect sealing under pressure.

The movable walls 5 are connected to a sleeve member 13 provided with a flange 8, mounted for rotation on an inclined member 14 fast with a main shaft 22 arranged along the main engine axis.

The flange 8 is provided with stays 7 integral with the flange and, protruding from one of its faces. The stays are connected to the movable walls 5 of the chambers 1. The member formed by sleeve 13, flange 8 and stays 7 will be called a flanged transmission member.

In the embodiment shown in FIGURE 1 the connection is effected by a ball joint comprising a sphere 9 on each stay 7, which is articulated in a socket 10 mounted for transverse displacement in a recess 11 in each movable wall 5. By virtue of this connection when the movable walls 5 reciprocate the stays 7 perform oscillations and transverse displacements with respect to the movable walls 5 on account of the different paths of movement of the articulation and the mobile wall.

The flange 8 and stays 7 fast therewith are connected to the stationary machine components so as to perform a movement such that the flange 8 and stays 7 move throughout along paths belonging to the family of the cycloids.

In the embodiment shown in FIGURE 1 the connection comprises a toothed rim 17 of the sleeve member 13, meshing with a toothed wheel 18 fast with the stationary block 2 of the machine. This connection results in a relative reciprocation of the movable walls 5, so that when the flanged transmission member 8 is subjected to pressures, the components of the latter are transmitted to the inclined member 14 fast with the engine shaft 22, whereby the latter is rotated.

In the embodiment shown in FIGURE 1 the inclined member 14 which is fast with the engine shaft is formed with a flange 15 adapted to counteract the pressures on the flange 8. In order to reduce friction between the flanges 15 and 8, a disc 16 is interposed therebetween and is rotated at a speed which is a fraction of the shaft speed. This rotation is effected in the embodiment shown by means of an internal bevel set of teeth 19 in the disc 16 cooperating with a bevel pinion 20 fast with a stationary cap 21 which completes closure of the engine block 2.

With this arrangement the product of the specific pressures by the speed of the cooperating members can be reduced to permit adoption of high rates of speed.

Alternatively, the disc 16 is replaced by two concentrical conical roller bearings shown in FIGURE 13, wherein the bearings comprise rollers 53, 54 held in two cages each comprising two rings 55, 55a; 56, 56a interconnected by spokes. The inner bearing is centered on the hub of the inclined member 14 through the interposition of a ring 51. The external race rings 55, 56 of the two bearings have fitted thereon two further rings 50, 50a adapted to take up centrifugal stresses transmitted by the rollers.

In the embodiment shown in FIGURE 1 the engine shaft 22 is hollow and is formed with a coaxial bore 23. The shaft 22 has mounted thereon in each engine half an inclined member 14 keyed to the engine shaft by means of cotters 24 or other connecting means.

The engine shaft is centrally supported by a bearing 2a with the block 2 and at its ends by two bearings 21a integral with the end caps 21. The member 14 is equipped with a balancing counterweight 25.

In the embodiment shown in FIGURE 2 the chambers 1 in which the thermodynamic cycles are performed, have a curved axis. In this case the movable walls of the chambers can be integral with the stays 7 of the flange 8. The chambers 1 and movable walls 5 can be of a cross section of any geometrical form, such as circular or noncircular comprising straight and curved walls as shown in FIGURE 3.

In the embodiment shown in FIGURE 3 the block comprises an external annular band 26 and an internal annular band 27, the bands being interconnected by radical partitions 28 to define a plurality of chambers 1a of noncircular cross sectional shape.

The distribution of working fluids in the chambers 1 and discharge of combustion products can be performed by two stroke cycles through ports opening directly into the chambers in a known manner, or with four or more stroke cycles, they can be valve-operated.

The embodiments in FIGURES 4 and 5 relate to two modifications of the valve gear. In FIGURE 4 combustion chambers 29 are fed with working fluid from respective supply conduits 30.

Each conduit 30 is intercepted by a mushroom valve 31 having a stem 32 biassed by a spring 33 which normally keeps the valve closed. The valve 31 opens under the action of a tappet 36 acting on a lever 34 pivoted at a fixed point 35, the other end of the tappet 36 being acted upon by a cam 37 carried by a valve gear shaft 38 coaxial with the engine shaft 22.

The valve control tappet 36 is located between two adjacent chambers, whereby the overall size of the engine can be reduced and construction simplified.

The embodiment shown in FIGURE 5 shows a pair of valves 31, 31a, the valve 31a controls a conduit 30a and is opened by a traction on its stem 32a. The valve may then be operated by a desmodromic cam. With this arrangement both valves 31, 31a can be arranged close to each other so that when seen along their stems, their mushrooms superpose all or in part, so as to reduce the overall engine size.

FIGURE 6 shows a modification in which the movable walls of the chambers are integral with the stays 7 and are in the form of shaped extensions 7a fast with the stays. The seal between the side wall of the chamber 1 and the extension 7 being effected by expansible resilient rings 6, shown in detail in FIGURES 7 and 8. The rings comprise sets of segments 6a, 6b, 6c, 6d biassed against the side wall of the chamber 1 by a spring 6e located at the bottom of a groove in the extension 7a, accommodating said segments.

In the modification shown in FIGURE 8 (which may apply to the piston rings shown in any of the other figures) the segments are clamped by a plurality of clamps 6f, which hold the segments together when the resilient ring is removed from its groove.

With the above construction the reciprocating masses can be considerably reduced, inasmuch as the flange 8, stays 7 and extensions 7a fast with the stays perform as mentioned above a cycloidical movement.

According to FIGURE 9 the interconnection of the flange 8 and a stationary component of the block can be effected, instead of toothed rings 17, 18, as shown in FIGURES 1, 2 and 6, by interengagement of fingers 39 carried by the flange 8 and shaped guides 41 defined by projections 42, 43 fast with the engine cap 21. The fingers 39 can be provided with rollers 40 rolling in the cycloidal recess defined by the said projections, whereby the flange 8 is caused to move over cycloidical paths.

According to a modification shown in FIGURE 10, the flanged transmission member is prevented from slipping off of the inclined member 14 by a flared extension formed on the sleeve 13 and provided with an annular lip 44. The lip 44 slidably engages an annular conical track 45 on a retaining collar 46 fast with the block 2.

According to a further modification shown in FIG. 11, the flanged transmission member 8 is axially retained on the member 14 by a spherical guide 47 extending from the rear face of the flange 8 and slidably engaging the mating inner surface of the outer cap 21 of the engine. Rolling means can be provided between the guide 47 and cap 21 to reduce friction.

In the modification shown in FIGURE 12 the side wall of each chamber 1 in which the thermodynamic cycles are performed, is bored within a cylindrical body 48 slidably mounted in cylindrical recesses 1b formed in the block 2.

The cylindrical bodies 48 are axially moved at a linear speed which is a fraction of the speed of the movable walls 5. This movement can be effected through interengagement of a tooth shapped extension 49 on each of the cylindrical bodies 48 and a corresponding recess 52 in the flanged transmission member.

Oscillation of the flanged transmission member effects movement in either direction of the cylindrical bodies 48, with a view to reducing the relative speed and wear of the chamber side wall and movable wall 5.

With spark ignited high speed engines ignition distributors are adopted in accordance with the diagram in FIGURE 14, in order to reduce the rotational speed of a distributing rotor 57 and in order to avoid the known sparking as occurs in such cases. According to this construction the distributor cap is provided with a number of contacts which are a multiple of the number of spark plugs. By way of example, with an engine having three spark plugs 4, each spark plug is connected in series with two diametrally opposite contacts 62, 62a; 63, 63a; 64, 64a staggered over the path of the rotor 57 connected with the breaker switch 58 operating the contact points 59, 60.

On each revolution of the rotor 57 the high tension current from the ignition coil 61 reaches twice each plug 4 namely when the rotor 57 slides over the contacts associated with each plug.

What I claim is:
1. A rotary internal combustion engine comprising a plurality of chambers in an engine block, each chamber having a curved axis and arranged about a main axial central shaft, at least one movable end wall for each chamber to define with the chamber a variable volume for performing the working cycles of the engine, an inclined member rigid with the central shaft for transmitting motion from the movable wall to the shaft, and a flanged transmission member carried by the shaft and interposed between the movable walls and the inclined member, the flange transmission member being in the form of a flanged sleeve mounted for rotation on the inclined member, a plurality of rigid stays fast with the transmission member and protruding from one face of the flanged sleeve toward the movable wall, each stay having its free end directly and rigidly connected to the movable chamber walls, the flanged transmission member being connected with the engine block so that it moves along paths belonging to the family of cycloids.

2. Rotary engine as claimed in claim 1, wherein the movable walls of the cycle chambers are integral with the stays on the flanged transmission member, sealing between said movable walls and chamber side walls being effected by resilient rings interposed therebetween.

3. Rotary engine as claimed in claim 2, wherein the resilient sealing rings on the movable chamber walls comprise sets of annular elements biassed by springs and held together by clamps.

4. Rotary engine as claimed in claim 1, wherein the chambers are of circular cross sectional shape.

5. Rotary engine as claimed in claim 1, wherein the chambers are of non-circular cross sectional shape.

6. Rotary engine as claimed in claim 1, wherein the chambers are provided with valves operated by rods arranged between the chambers operated by cams carried by a shaft coaxial with the main axial central control shaft.

7. Rotary engine as claimed in claim 1, wherein the flanged transmission member is formed with a flared extension having an annular lip slidably bearing on an annular conical retaining track mating with the lip, the annular conical retaining track being fast with the stationary engine block.

8. Rotary engine as claimed in claim 1, wherein the flanged transmission member is provided with a bevel toothed rim meshing with a bevel toothed rim fast with the engine block for imparting a cycloidal movement to said flanged transmission member.

9. Rotary engine as claimed in claim 1, wherein the engine is of the spark ignition type and includes a spark plug for each working chamber, a distributor with a cap, and the cap of the ignition distributor is provided with a plurality of electrically connected contacts for each spark plug so that the number of contacts is a multiple of the number of plugs.

References Cited

UNITED STATES PATENTS

| | | | |
|---|---|---|---|
| Re. 15,442 | 9/1922 | Almen | 123—58 |
| 1,480,506 | 1/1924 | Clementz | 123—58 |
| 1,539,752 | 5/1925 | McCain et al. | 123—58 |
| 1,582,076 | 4/1926 | Page | 123—58 |
| 2,227,998 | 1/1941 | Borer et al. | 123—58 |
| 2,332,105 | 10/1943 | Neuland | 123—58 |
| 2,513,083 | 6/1950 | Eckert | 123—58 |

FOREIGN PATENTS

| | | |
|---|---|---|
| 448,421 | 11/1912 | France. |
| 603,137 | 1/1926 | France. |

CARLTON R. CROYLE, *Primary Examiner.*

W. E. BURNS, *Assistant Examiner.*